(12) United States Patent
Yokota (10) Patent No.: US 7,146,071 B2
(45) Date of Patent: Dec. 5, 2006

(54) OPTICAL TRANSMISSION SYSTEM

(75) Inventor: Izumi Yokota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 60 days.

(21) Appl. No.: 10/939,410

(22) Filed: Sep. 14, 2004

(65) Prior Publication Data

US 2005/0259990 A1    Nov. 24, 2005

(30) Foreign Application Priority Data

May 20, 2004    (JP)    ............................ 2004-150061

(51) Int. Cl.
  *G02B 6/26*    (2006.01)
  *H04J 14/02*   (2006.01)
(52) U.S. Cl. .......................... 385/24; 385/24; 385/42; 385/123; 385/124; 398/79; 398/80; 398/81; 398/82; 398/83; 398/92; 359/341.1
(58) Field of Classification Search ................. 385/24, 385/42, 123, 124; 398/79, 80, 81, 82, 83
See application file for complete search history.

(56) References Cited

U.S. PATENT DOCUMENTS

| | | | |
|---|---|---|---|
| 5,798,855 A * | 8/1998 | Alexander et al. ............. | 398/34 |
| 6,108,468 A * | 8/2000 | Kaneko et al. ................ | 385/24 |
| 6,324,318 B1 * | 11/2001 | Suzuki ......................... | 385/24 |
| 6,388,803 B1 * | 5/2002 | Knox .......................... | 359/337.1 |
| 6,507,431 B1 | 1/2003 | Sugaya et al. ......... | 359/341.32 |
| 6,661,947 B1 * | 12/2003 | Shirai ........................... | 385/24 |
| 6,678,087 B1 | 1/2004 | Masuda et al. ............... | 359/334 |
| 6,823,107 B1 * | 11/2004 | Muro et al. .................... | 385/27 |
| 2002/0093705 A1 * | 7/2002 | Okano et al. ................ | 359/124 |

OTHER PUBLICATIONS

European Search Report dated Aug. 30, 2005 in corresponding European Application No. 04023401.5.
"40 Gbit/s × 25 WDM 306 km unrepeatered transmission using 175 µm²-Aeff fibre," Tanaka et al., IEE Proceedings: Optoelectronics, vol. 150, No. 3, Jun. 2003, pp. 224-228.
Patent Abstracts of Japan, Pub. No. 09-179152, published Jul. 11, 1997.

* cited by examiner

*Primary Examiner*—Brian M. Healy
(74) *Attorney, Agent, or Firm*—Staas & Halsey LLP (57) ABSTRACT

An optical transmission system which permits transmission distance to be prolonged without using repeaters and yet ensures economical, high-quality optical transmission. A branch station performs non-repeated communication with an optical branching point and includes a light pumping section for causing pump light to enter an optical fiber through which a branched, receiving optical signal flows, to perform optical amplification by using the fiber as an amplification medium. An optical branching device includes an optical amplification section and an optical branching section. The optical amplification section redirects the pump light originated from the branch station and propagated through a line to the paired line through which an optical signal transmitted from the branch station flows, to excite an amplification medium inserted in the paired line and doped with active material for optical amplification and thereby amplify power of the optical signal transmitted from the branch station. The optical branching section branches the optical signal transmitted from the branch station and optical signals transmitted from other stations.

3 Claims, 8 Drawing Sheets

OPTICAL TRANSMISSION SYSTEM

CROSS-REFERENCE TO RELATED APPLICATIONS

This application is based upon and claims priority of Japanese Patent Application No. 2004-150061, filed on May 20, 2004, the contents being incorporated herein by reference.

BACKGROUND OF THE INVENTION (1) Field of the Invention

The present invention relates to an optical transmission system, and more particularly, to an optical transmission system for branching optical signals to allow the optical signals to be communicated among at least three stations or more.

(2) Description of the Related Art

In recent years, demand for international communications is rapidly increasing because of the globalization of business, the spread of the Internet, etc. Under the circumstances, submarine optical transmission systems are an important means of communication comparable to satellite communications, and expeditious realization of economical and large-capacity submarine optical transmission systems are in pressing need.

A submarine optical transmission system is a system whereby stations are interconnected by optical fiber cables laid under water for optical transmission. In the case of a system interconnecting at least three stations or more, an optical branching device is placed between stations to branch optical signals.

For submarine optical transmission on the scale of transoceanic transmission, repeaters are arranged in the middle of optical fiber cables. The repeaters are fed with electricity from stations to repeat and amplify optical signals. The optical branching device also plays the role of switching paths for feeding electricity to such repeaters.

Figure 6:
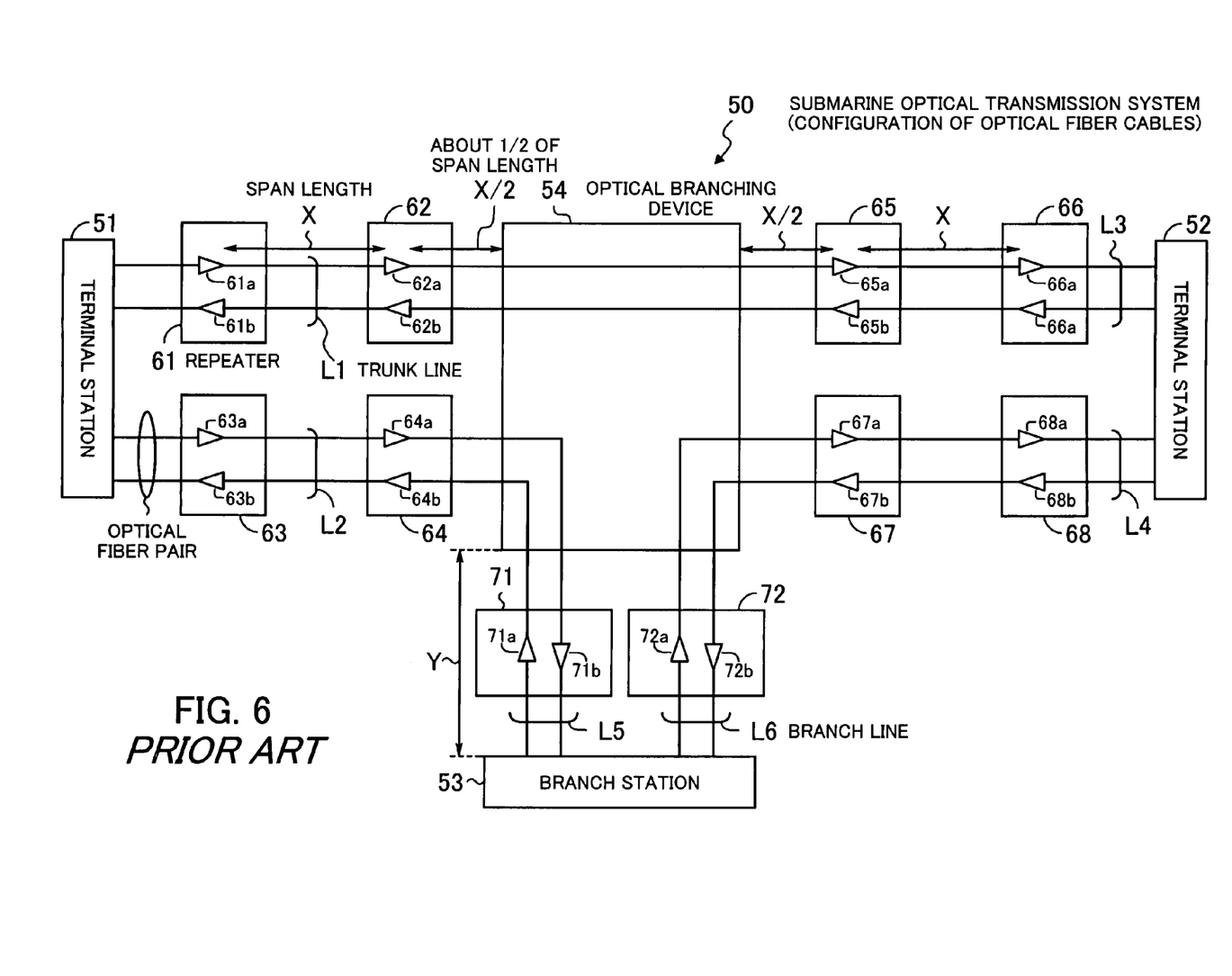
FIG. 6 is a diagram showing a configuration of a conventional submarine optical transmission system.
Figure 7:
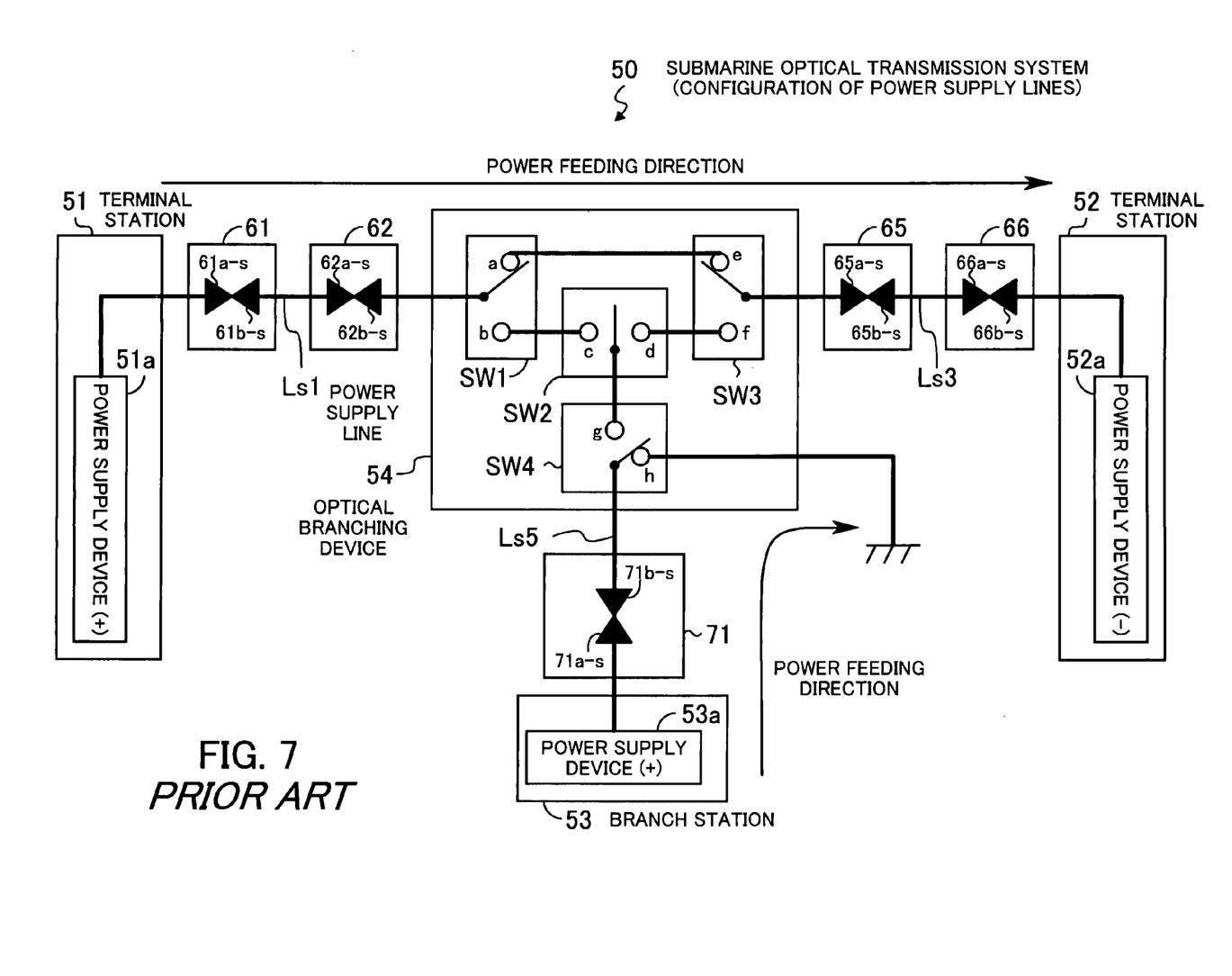
FIG. 7 is a diagram also showing a configuration of the conventional submarine optical transmission system.

FIGS. 6 and 7 illustrate the configuration of a conventional submarine optical transmission system. The submarine optical transmission system 50 comprises terminal stations 51 and 52, a branch station 53, and an optical branching device 54. The terminal stations 51 and 52 and the branch station 53 are land stations while the optical branching device 54 is placed under water.

In the submarine optical transmission system, lines interconnecting stations include an optical fiber cable for transmitting optical signals and a metallic power supply line for feeding electricity. Accordingly, the configuration of optical fiber cables and the configuration of power supply lines are separately illustrated in FIGS. 6 and 7, respectively.

Referring to FIG. 6, where the terminal stations 51 and 52 are stations operated in different countries, for example, the transmission distance is significantly long. In such cases, repeaters 61 to 64 are inserted in lines L1 and L2 interconnecting the terminal station 51 and the optical branching device 54 (lines interconnecting a terminal station and an optical branching device are referred to as trunk lines), and repeaters 65 to 68 are inserted in trunk lines L3 and L4 interconnecting the terminal station 52 and the optical branching device 54.

The repeaters 61 to 68 of the trunk lines have repeater amplifiers 61a to 68a, respectively, for amplifying optical signals flowing from the terminal station 51 toward the terminal station 52, and also have repeater amplifiers 61b to 68b, respectively, for amplifying optical signals flowing from the terminal station 52 toward the terminal station 51.

In the case of inserting repeaters in trunk lines, provided the interval (span length) between repeaters is X, the repeaters 62, 64, 65 and 67 which are nearest to the optical branching device 54 are generally located at a distance of about ½ of the span length X from the optical branching device 54. Alternatively, such repeaters are arranged at locations such that the distance of the sum of the two intervals (e.g., {distance between the repeater 62 and the optical branching device 54}+{distance between the repeater 65 and the optical branching device 54}) is nearly equal to the span length X.

On the other hand, repeaters 71 and 72 are inserted in lines (referred to as branch lines) L5 and L6 interconnecting the branch station 53 and the optical branching device 54. The branch station 53 is situated, for example, on an island located in the ocean between the terminal stations 51 and 52.

The distance between the branch station 53 and the optical branching device 54 is shorter than the transmission distance between each terminal station and the optical branching device and therefore, in some cases, no repeaters are needed. Usually, however, repeaters are inserted also in the branch lines because of the need to extend the cable length by reason of geographical features of the ocean floor etc. or to improve the quality of optical transmission (generally, where the distance Y between the branch station and the optical branching device is longer than about ½ of the span length X, repeaters are inserted also in the branch lines).

The repeaters 71 and 72 of the branch lines have repeater amplifiers 71a and 72a, respectively, for amplifying optical signals transmitted from the branch station 53 to the optical branching device 54, and also have repeater amplifiers 71b and 72b, respectively, for amplifying optical signals transmitted from the optical branching device 54 to the branch station 53.

To briefly explain the flow of optical signals, an optical signal output from the terminal station 51 onto the trunk line L1, for example, is amplified by the repeater amplifiers 61a and 62a and received by the optical branching device 54. The optical signal is output through the optical branching device 54, then amplified by the repeater amplifiers 65a and 66a of the trunk line L3, and received by the terminal station 52. Also, an optical signal output from the terminal station 51 onto the trunk line L2 is amplified by the repeater amplifiers 63a and 64a and received by the optical branching device 54. Then, the optical signal is diverted toward the branch station 53 by the optical branching device 54, amplified by the repeater amplifier 71b of the branch line L5, and received by the branch station 53.

FIG. 7 illustrates the system configuration in terms of power supply lines. The terminal stations 51 and 52 have power supply devices 51a and 52a, respectively, and the branch station 53 has a power supply device 53a. FIG. 7 shows only power supply lines Ls1, Ls3 and Ls5 associated with the trunk lines L1 and L3 and the branch line L5, respectively, and their related component parts.

The repeater 61 includes a power supply section 61a–s for feeding electricity to the repeater amplifier 61a and a power supply section 61b–s for feeding electricity to the repeater amplifier 61b. Similarly, the repeaters 62, 65, 66 and 71 include power supply sections 62a–s, 65a–s, 66a–s and 71a–s for feeding electricity to the repeater amplifiers 62a, 65a, 66a and 71a, respectively, and power supply sections 62b–s, 65b–s, 66b–s and 71b–s for feeding electricity to the repeater amplifiers 62b, 65b, 66b and 71b, respectively.

The optical branching device 54 has switches SW1 to SW4 for switching power feeding paths. The switches SW1 to SW4 have terminals connected in such a manner that the terminals a and e, the terminals b and c, and the terminals d and f are respectively connected to each other by a fixed line. The terminal h of the switch SW4 is grounded.

In the illustrated state, the switch SW1 is switched to the terminal a side, the switch SW2 is open, and the switch SW3 is switched to the terminal e side. Accordingly, the power supply lines Ls1 and Ls3 are connected and electric current flows in the direction from the power supply device 51*a* (+) to the power supply device 52*a* (−), so that electricity is fed to the repeaters 61, 62, 65 and 66.

Also, the switch SW4 is switched to the terminal h side. Thus, current flows through the power supply line Ls5 in the direction from the power supply device 53*a* (+) to the ground (GND), so that electricity is fed to the repeater 71. While in this state, all repeaters on the lines are capable of operation, permitting optical communication among the terminal stations 51 and 52 and the branch station 53.

Figure 8:
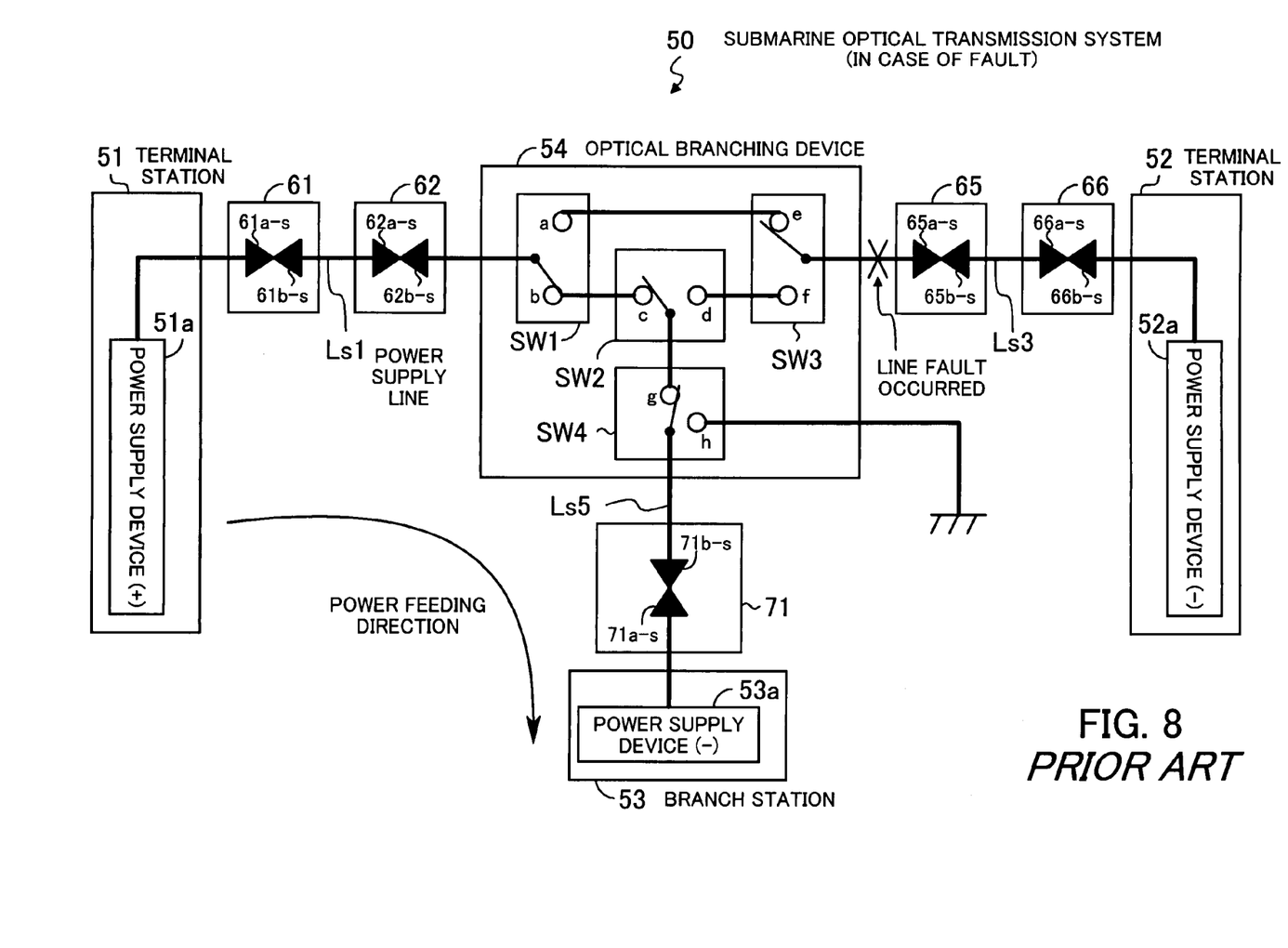
FIG. 8 is a diagram showing a switched state of power feeding paths in the case where a line fault has occurred.

FIG. 8 illustrates a switched state of the power feeding paths in the case where a line fault has occurred. If a line fault occurs at the location shown in FIG. 8, communication among all stations is interrupted. It is therefore necessary that the switches SW1 to SW4 of the optical branching device 54 be switched so as to continue communication service within an as broad range as possible.

In the switched state shown in FIG. 8, the switch SW1 is switched to the terminal b side, the switch SW2 is switched to the terminal c side, and the switch SW4 is switched to the terminal g side. Also, the power supply device 53*a* in the branch station 53 is changed to negative power supply.

Accordingly, the power supply lines Ls1 and Ls5 are connected and current flows in the direction from the power supply device 51*a* (+) to the power supply device 53*a* (−), whereby electricity is fed to the repeaters 61, 62 and 71, permitting communication to be continued between the terminal station 51 and the branch station 53.

Meanwhile, as conventional techniques relating to the optical amplification function applicable to repeaters etc., techniques have been proposed in which pump light is introduced into a rare earth-doped fiber and the residual pump light is reflected and is made to again enter the rare earth-doped fiber for the purpose of optical amplification (e.g., Unexamined Japanese Patent Publication No. H09-179152 (paragraph nos. [0072] to [0090], FIG. 1); and Unexamined Japanese Patent Publication No. 2001-117126 (paragraph nos. [0046] to [0048], FIG. 1)).

In the submarine optical transmission system 50 explained above, the repeaters 71 and 72 are inserted in the branch lines L5 and L6, respectively, and thus need to be fed with electricity from the branch station 53. Also, the optical branching device 54 is required to perform switching control for the power feeding paths in case a line fault occurs, in order to continue communication service within an as broad range as possible, and thus is constantly put under high pressure. Accordingly, the optical branching device 54 needs to have a high pressure-resistant structure and requires high pressure-resistant electric relays (vacuum relays etc.), and this makes the device expensive. Also, since the branch station 53 includes the power supply device 53*a*, the cost of the overall system increases.

If the repeaters 71 and 72 can be omitted from the branch lines L5 and L6, then the optical branching device 54 need not have the power switching function and the branch station 53 need not be equipped with the power supply device 53*a*, making it possible to construct an inexpensive system.

However, since the branch station 53 and the optical branching device 54 are interconnected with no repeater amplifiers arranged therebetween, the optical transmitting/receiving function of the branch station 53 is required to meet rigorous specifications. To avoid this, the optical branching device 54 may be located as near to the branch station 53 as possible to shorten the transmission distance. Because of the problem of geographical features of the ocean floor or cable route, however, it is very often difficult in practice to locate the optical branching device 54 near the branch station 53. For this reason, it has been difficult up to the present to construct economical submarine optical transmission systems.

According to the aforementioned conventional techniques (Unexamined Japanese Patent Publications No. H09-179152 and No. 2001-117126), the pump light is introduced into a rare earth-doped fiber and the residual pump light is also used to amplify the optical signal input to the device. However, these techniques are focused only on efficient use of the pump light and no consideration is given to construction of systems requiring no repeaters in the branch lines.

SUMMARY OF THE INVENTION

The present invention was created in view of the above circumstances, and an object thereof is to provide an optical transmission system which permits transmission distance to be prolonged without the need for repeaters, thus is economical and yet capable of high-quality optical transmission.

To achieve the object, there is provided an optical transmission system for branching optical signals to allow the optical signals to be communicated among at least three stations or more. The optical transmission system comprises a branch station for performing non-repeated optical communication with an optical branching point, the branch station including a light pumping section for causing pump light to enter an optical fiber through which a branched, receiving optical signal flows, to perform optical amplification by using the optical fiber as an amplification medium, and an optical branching device including an optical amplification section for redirecting the pump light originated from the branch station and propagated through a line to a paired line through which an optical signal transmitted from the branch station flows, to excite an amplification medium inserted in the paired line and doped with an active material for optical amplification and thereby amplify power of the optical signal transmitted from the branch station, and an optical branching section for branching the optical signal transmitted from the branch station as well as optical signals transmitted from other stations.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
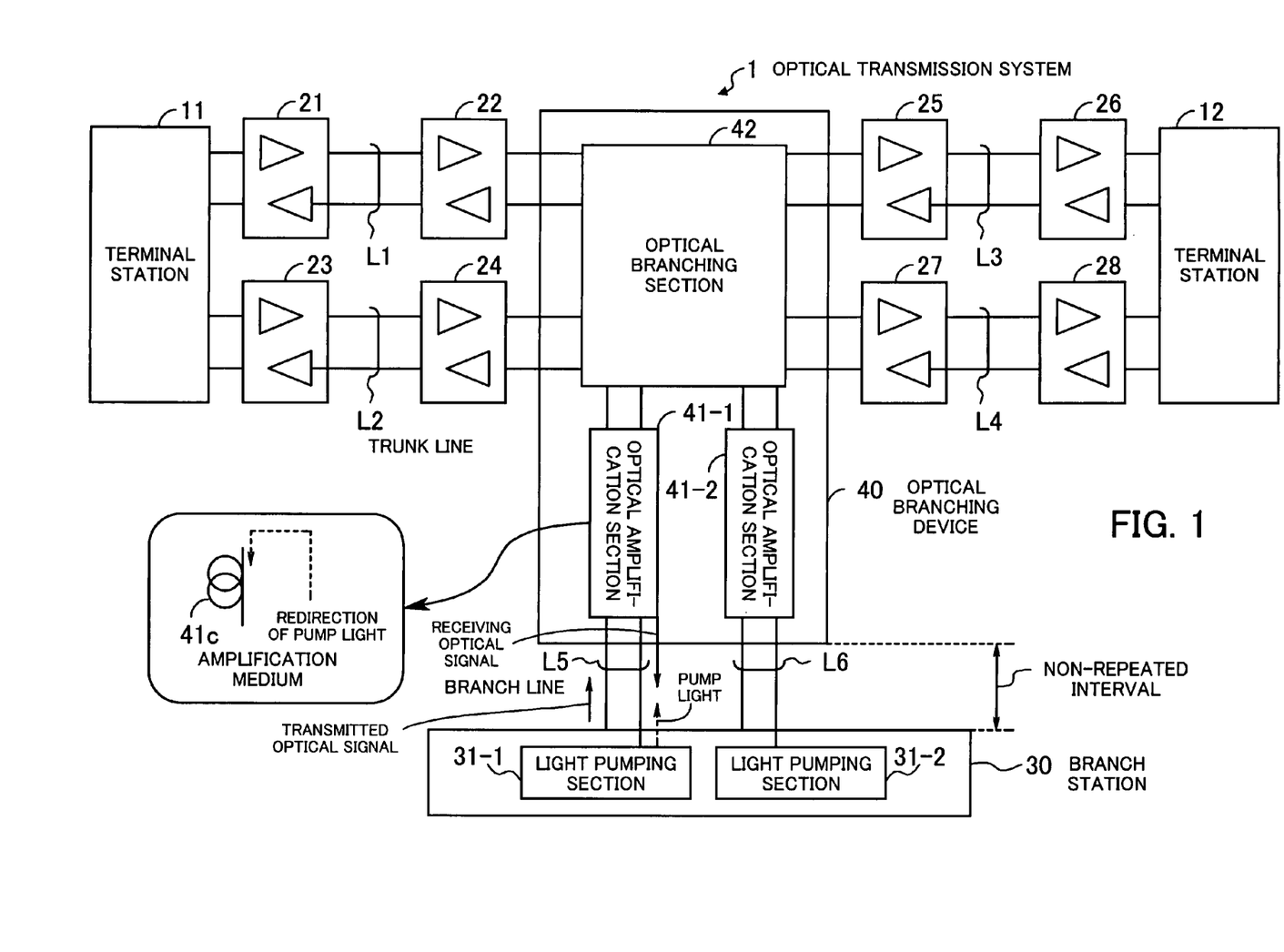
FIG. 1 is a diagram illustrating the principle of an optical transmission system according to the present invention.

An embodiment of the present invention will be hereinafter described with reference to the drawings. FIG. 1 illustrates the principle of an optical transmission system according to the present invention. The optical transmission system 1 is a system for branching optical signals to allow the signals to be communicated among at least three stations or more and is applied, for example, to a submarine optical transmission system.

The optical transmission system 1 comprises terminal stations 11 and 12, a branch station 30, and an optical branching device 40. The terminal station 11 is connected to the optical branching device 40 by trunk lines L1 and L2, the terminal station 12 is connected to the optical branching device 40 by trunk lines L3 and L4, and the branch station 30 is connected to the optical branching device 40 by branch lines L5 and L6.

Repeaters 21 and 22 are inserted in the trunk line L1, and repeaters 23 and 24 are inserted in the trunk line L2. Repeaters 25 and 26 are inserted in the trunk line L3, and repeaters 27 and 28 are inserted in the trunk line L4. The branch lines L5 and L6 have no repeaters arranged therein and thus, non-repeated transmission is performed.

The branch station 30 includes light pumping sections 31-1 and 31-2 and carries out non-repeated optical communication with the optical branching device 40. The light pumping sections 31-1 and 31-2 each cause pump light to enter an optical fiber through which an optical signal branched by an optical branching section 42 (a receiving optical signal to be received by the branch station 30) flows, to perform optical amplification by using the optical fiber as an amplification medium.

The optical branching device 40 is constituted by optical amplification sections 41-1 and 41-2 and the optical branching section 42. The optical amplification sections 41-1 and 41-2 each redirect the pump light originated from the branch station 30 and propagated through the line to the paired line through which the optical signal transmitted from the branch station 30 flows, to excite an amplification medium 41c inserted in the paired line and doped with an active material for optical amplification and thereby amplify the power of the optical signal transmitted from the branch station 30.

The optical branching section 42 branches the optical signal transmitted from the branch station 30 (e.g., the amplified optical signal transmitted from the branch station 30 is directed to the terminal station 11) as well as optical signals transmitted from the other stations (e.g., the optical signal from the terminal station 11 is directed to the branch station 30 or to the terminal station 12).

The optical branching section 42 may switch optical signal paths for respective optical fibers (as in the system described above with reference to FIG. 6). Alternatively, where the system is adapted for WDM (Wavelength Division Multiplex) transmission, the optical branching section 42 may perform OADM (Optical Add Drop Multiplex) control to drop and insert optical signals of respective wavelengths. Namely, with respect to wavelength-multiplexed signals communicated between the terminal stations 11 and 12, signals of specified wavelengths are dropped to the branch station 30 or the signals from the branch station 30 are added.

Figure 2:
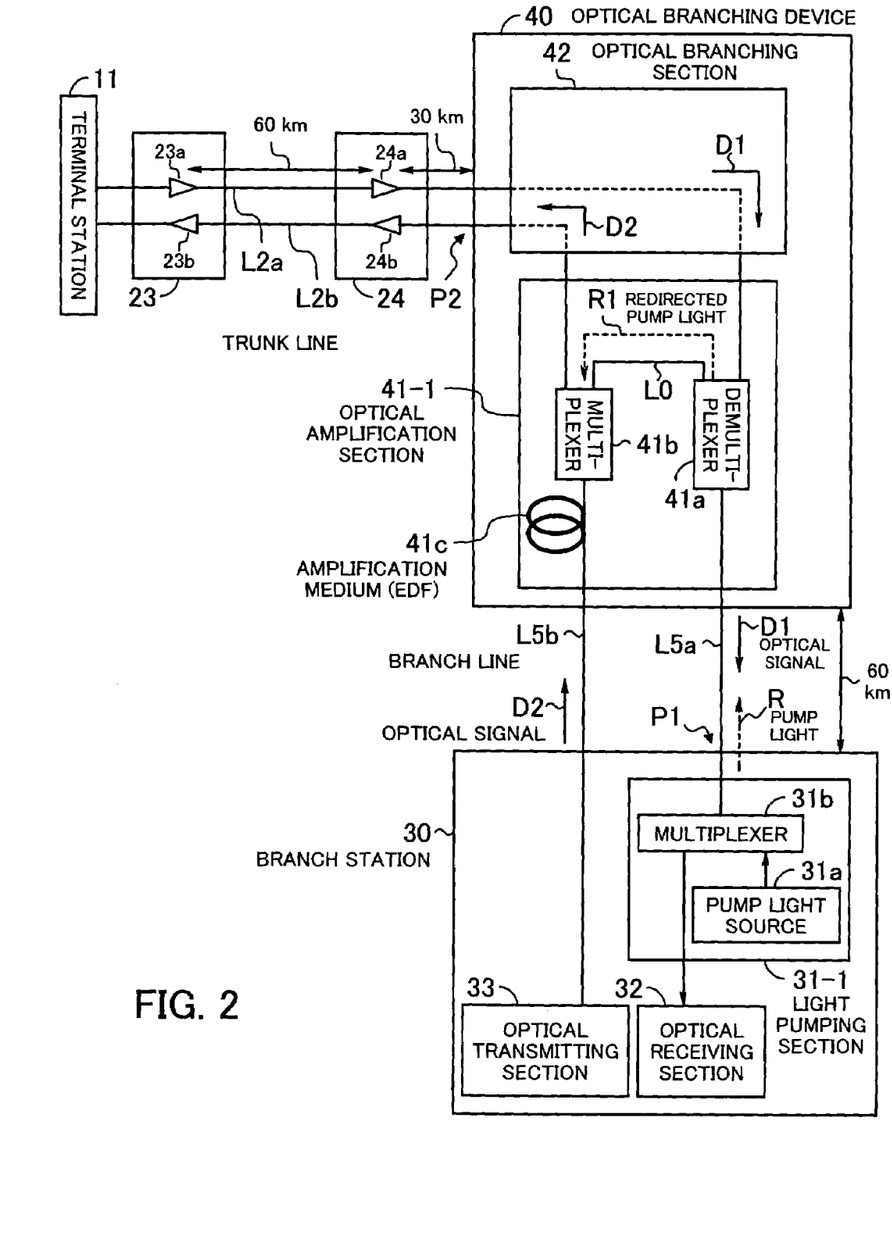
FIG. 2 is a diagram showing configurations of a branch station and an optical branching device.

Configurations and operations of the branch station 30 and the optical branching device 40 will be now described. FIG. 2 illustrates the configurations of the branch station 30 and the optical branching device 40. FIG. 2 shows only those component parts which are related with the branch connection between the terminal station 11 and the branch station 30 through the optical amplification section 41-1 and the optical branching section 42.

The terminal station 11 and the optical branching device 40 are interconnected by trunk lines L2a and L2b, and the repeaters 23 and 24 are inserted in the trunk lines. The repeater 23 includes repeater amplifiers 23a and 23b, and the repeater 24 includes repeater amplifiers 24a and 24b. The branch station 30 and the optical branching device 40 are interconnected by branch lines L5a and L5b.

Let it be assumed here that the repeating interval (usually called span length) between the repeaters 23 and 24 of the trunk lines L2a and L2b is 60 km, that the interval between the repeater 24 and the optical branching device 40 is 30 km, and that the interval between the branch station 30 and the optical branching device 40 interconnected by the branch lines L5a and L5b is equal to the ordinary span length and therefore, 60 km (in the conventional system, repeaters need to be inserted in the branch lines, but the present invention does not require such repeaters).

The branch station 30 is constituted by the light pumping section 31-1, an optical receiving section 32, and an optical transmitting section 33. The light pumping section 31-1 includes a pump light source 31a and a multiplexer 31b. The optical branching device 40 is constituted by the optical amplification section 41-1 and the optical branching section 42. The optical amplification section 41-1 includes a demultiplexer 41a, a multiplexer 41b, and the amplification medium 41c.

The multiplexer 31b for multiplexing an optical signal D1 with pump light R is connected to the line immediately short of the receiving end of the branch station 30, and the pump light source 31a is connected to the multiplexer such that the pump light R is propagated in a direction opposite to the direction of the receiving optical signal D1 (to carry out backward pumping). The pump light R travels through the branch line L5a, so that the optical signal D1 undergoes Raman amplification, due to the pump light R, within the optical fiber constituting the transmission path of the branch line L5a. The optical signal D1 is received by the optical receiving section 32 through the multiplexer 31b.

Raman amplification makes use of the physical phenomenon that light with wavelengths different from those of incident light is scattered due to oscillations within a material, and is caused to take place by introducing intense pump light into an optical fiber transmission path to achieve optical amplification by using the optical fiber transmission path itself as an amplification medium.

The peak of the gain induced by Raman scattering appears at a frequency position shifted on the longer wavelength side by about 100 nm. Namely, an optical signal with a wavelength longer than that of the incident pump light by about 100 nm is pumped. Thus, to amplify an optical signal with a wavelength of 1.55 µm, for example, pump light with a wavelength in the vicinity of the range from 1.45 to 1.48 µm, which is shorter in wavelength than the optical signal by about 100 nm, is introduced into the optical fiber transmission path.

Not all of the pump light R is consumed by Raman amplification, and the residual light is propagated through the optical fiber (branch line L5a) and input to the optical amplification section 41-1 of the optical branching device 40.

The demultiplexer 41a in the optical amplification section 41-1 separates the pump light R transmitted from the branch station 30 and redirects the separated light to a line L0 interconnecting the demultiplexer 41a and the multiplexer 41b. The multiplexer 41b multiplexes the separated pump light R (pump light remaining after Raman amplification) with an optical signal D2 transmitted from the paired line (branch line L5b). At this time, the pump light R and the optical signal D2 are multiplexed such that their propagation directions are opposite to each other.

Also, a fiber doped with a rare-earth element (e.g., EDF (Erbium-Doped Fiber) doped with erbium ($Er^{3+}$)) is inserted in the branch line L5b at a location where the redirected pump light R is introduced (the amplification medium 41c will be hereinafter referred to as EDF 41c).

Where the optical signal is propagated with the pump light introduced into the EDF, the level of the optical signal increases due to the stimulated emission then induced. In the present invention, the redirected pump light R1 propagated through the line L0 is used as the pump light for the EDF 41c to amplify the power of the optical signal D2 transmitted from the branch station 30.

Thus, according to the present invention, the optical signal D1 flowing through the branch line L5a is subjected to Raman amplification by the pump light R while the optical signal D2 flowing through the branch line L5b is amplified by the EDF 41c into which the redirected pump light R1 is introduced, making it unnecessary to insert repeaters in the branch lines interconnecting the optical branching device 40 and the branch station 30. This eliminates the need to use conventionally required component parts, that is, expensive power supply switches in the optical branching device 40 and a power supply device in the branch station 30, thus making it possible to significantly cut down the cost, compared with the conventional system, and to construct economical systems.

Also in the aforementioned conventional techniques (Unexamined Japanese Patent Publications No. H09-179152 and No. 2001-117126), the redirected pump light (residual pump light) is introduced into the EDF. According to the conventional techniques, however, the pump light (pump light for the EDF) originated from the pump light source is introduced into the EDF, and the pump light output from one end of the EDF is reflected by a mirror to be again introduced into the EDF. Thus, the techniques do no use Raman pump light which has been propagated through a line, but the pump light for the EDF is merely reflected inside the device and reused just to amplify the optical signal flowing through a single line.

According to the present invention, by contrast, the Raman pump light propagated through one line is redirected to the other paired line so that the redirected pump light may be introduced into the EDF inserted in the paired line. This arrangement permits amplification control to be performed such that the optical amplifications of up- and down-lines are interrelated with each other. Since Raman amplification is performed with respect to one of the up- and down-lines while optical amplification by means of the EDF is performed with respect to the other line, optical signals on the two lines can be amplified with high efficiency, and as a consequence, no repeaters need to be arranged in the up- and down-lines.

In the following, comparison will be made between the operation of the system of FIG. 2 when Raman amplification is performed using the pump light R and the operation of the same system when no Raman amplification is performed, by giving specific numerical values, to explain the reason why no repeaters need to the inserted in the branch lines.

Figure 3:
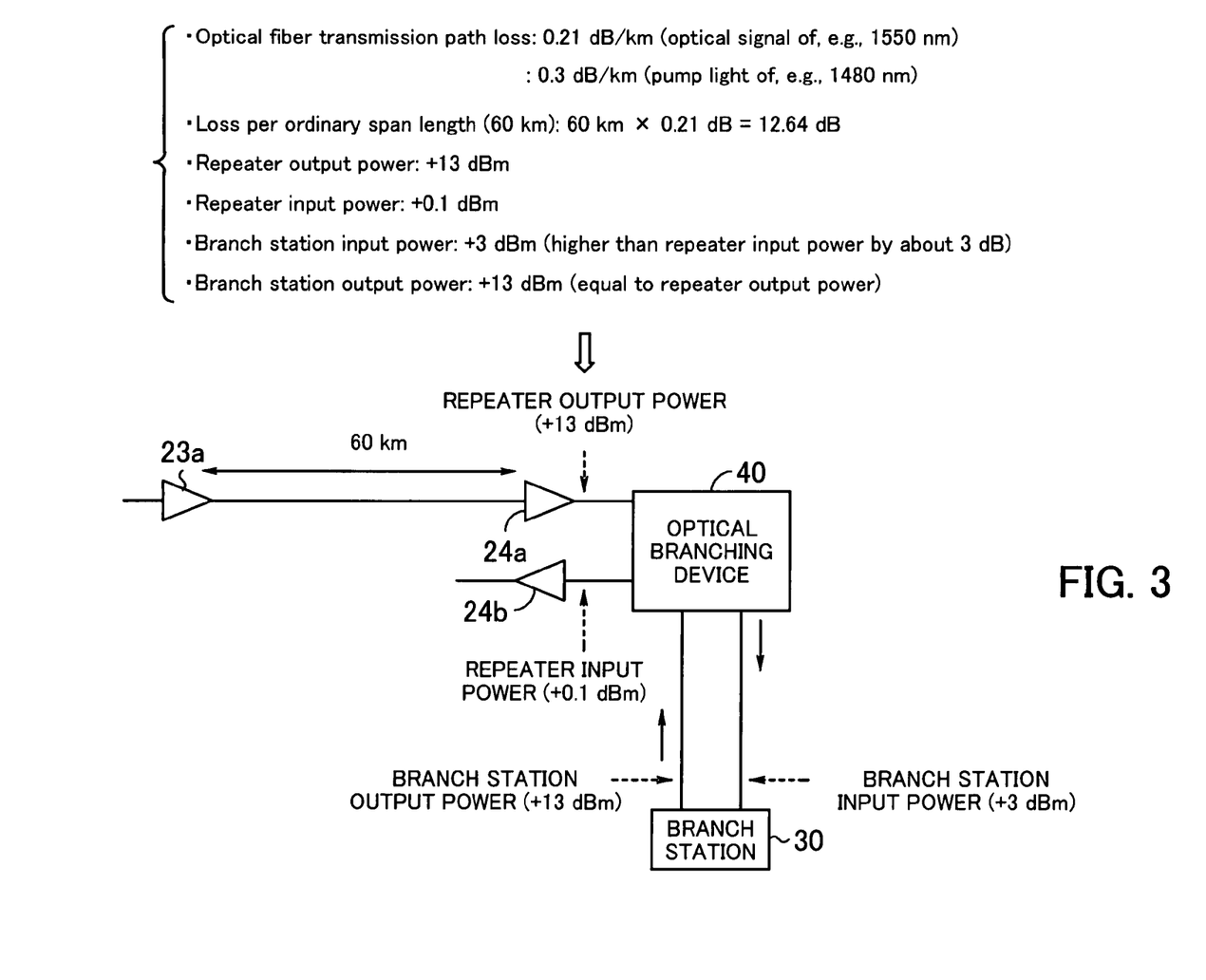
FIG. 3 is a diagram showing set values given as initial conditions.

FIG. 3 is a diagram showing set values given as initial conditions. The optical fiber transmission path loss, ordinary span length, repeater input/output power and branch station input/output power are set to the respective values indicated in FIG. 3.

First, the power of the optical signal D1 input to the branch station 30 (the branch station input power at a location P1 in FIG. 2) will be considered.

(a) Case where Raman amplification by means of the pump light R is not performed The branch station input power is given by (output power of the repeater amplifier 24a)−(length of the optical fiber transmission path from the repeater 24 to the branch station 30)×(fiber loss caused during optical signal transmission), hence +13 dBm−(30 km+60 km)×0.21 dB/km=−5.9 dBm.

(b) Case where Raman amplification is performed using the pump light R

In this case, the branch station input power is given by (output power of the repeater amplifier 24a)−(length of the optical fiber transmission path from the repeater 24 to the branch station 30)×(fiber loss caused during optical signal transmission)+(gain that the optical signal D1 acquires when the pump light R is introduced).

Figure 4:
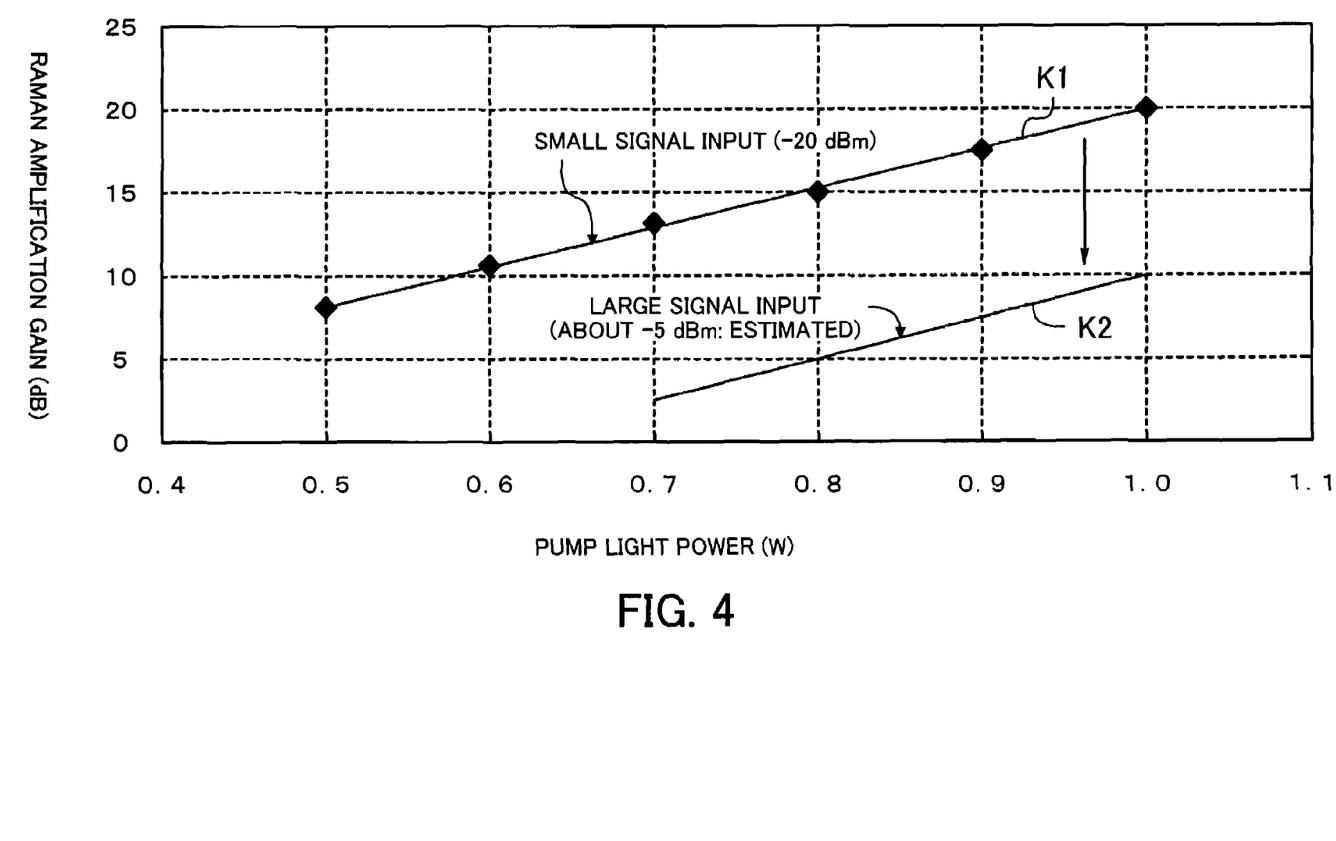
FIG. 4 is a graph illustrating the relation between pump light power and Raman amplification.

Here, the power of the pump light R to be introduced into the system of the present invention will be explained. FIG. 4 shows the relation between pump light power (W) and Raman amplification gain (dB), wherein the horizontal axis indicates pump light power (W) and the vertical axis indicates Raman amplification gain (dB).

Curve K1 shows the relation between the pump light power and the Raman amplification gain observed when backward Raman pumping is performed (the pump light is introduced in a direction opposite to that of signal light) with respect to an optical signal with small power of about −20 dBm.

The curve K1 reveals that when the pump light power is 1 W, for example, the optical signal acquires a gain of 20 dB (the power of the optical signal increases by 20 dB; namely, the input optical signal with the power −20 dBm undergoes a power increase from −20 dBm to 0 dBm (=−20 dBm+20 dBm). Thus, when the power of the optical signal is significantly small (−20 dBm or below), a gain of 20 dB or more can be obtained using 1 W pump light.

On the other hand, in the case where no pump light is used in the system of FIG. 2, the power of the optical signal is about −5 dBm, as mentioned in (a) above. Since the optical signal D1 with relatively large power is input, the gain remains small even for the same pump light power. Assuming that the gain is 10 dB or less, the relation between the pump light power and the Raman amplification gain observed in the case where backward Raman pumping is performed with respect to an optical signal with large power of about −5 dBm can be plotted as curve K2 (estimated curve). The curve K2 indicates that when the pump light power is 1 W, the optical signal acquires a gain of 10 dB.

Accordingly, in the case of performing Raman amplification by using the pump light R, the "gain that the optical signal D1 acquires when the pump light R is introduced" is 10 dB if the output of the pump light source 31a is 1 W.

Thus, for the branch station input power, (output power of the repeater amplifier 24a)−(length of the optical fiber transmission path from the repeater 24 to the branch station 30)×(fiber loss caused during optical signal transmission)+(gain that the optical signal D1 acquires when the pump light R is introduced)=+13 dBm−(30 km+60 km)×0.21 dB/km+10 dB=+4.1 dBm. This value is higher than the branch station input power (+3 dBm) shown in FIG. 3 as the initial condition and thus satisfies the branch station input condition without the use of repeater amplification, proving that the optical signal does not require a repeater to be transmitted over the branch line L5a.

The input power of the repeater amplifier 24b (power at a location P2 in FIG. 2) will be now considered. It is assumed here that the pump light source 31a with a pump power of 1 W is used.

(a) Case where Raman amplification by means of the pump light R is not performed The repeater amplifier input power is given by (transmit output power of the optical signal D2 from the branch station 30)−(length of the optical fiber transmission path from the branch station 30 to the repeater 24)×(fiber loss caused during optical signal transmission), hence +13 dBm−(60 km+30 km)×0.21 dB/km=−5.9 dBm.

(b) Case where Raman amplification is performed using the pump light R

First, the gain of the redirected pump light R1 introduced into the EDF 41c will be derived. The gain of the redirected pump light R1 is given by (pump light power)−(branch line length)×(fiber loss caused during pump light propagation)−(overall loss caused by the demultiplexer 41a and the multiplexer 41b). Provided the "overall loss caused by the demultiplexer 41a and the multiplexer 41b" is 0.5 dB, then 30 dB−60 km×0.3 dB−0.5 dB=11.5 dB.

In the above instance, 1 W of pump light power is converted into decibels as equivalent to 30 dBm. The conversion formula used is $Y \text{ dBm}=10\times\text{Log}_{10}(X \text{ mW}/1 \text{ mW})$. For 1 mW, for example, X=1, then $Y=10\times\text{Log}_{10}1=10\times 0=0$ dBm, and for 2 mW, X=2, then $Y=10\times\text{Log}_{10}2=10\times 0.301\ldots=3$ dBm. Thus, for 1 W, $Y=10\times\text{Log}_{10}(1/10^{-3})=10\times\text{Log}_{10}10^{3}=30$ dBm.

Figure 5:
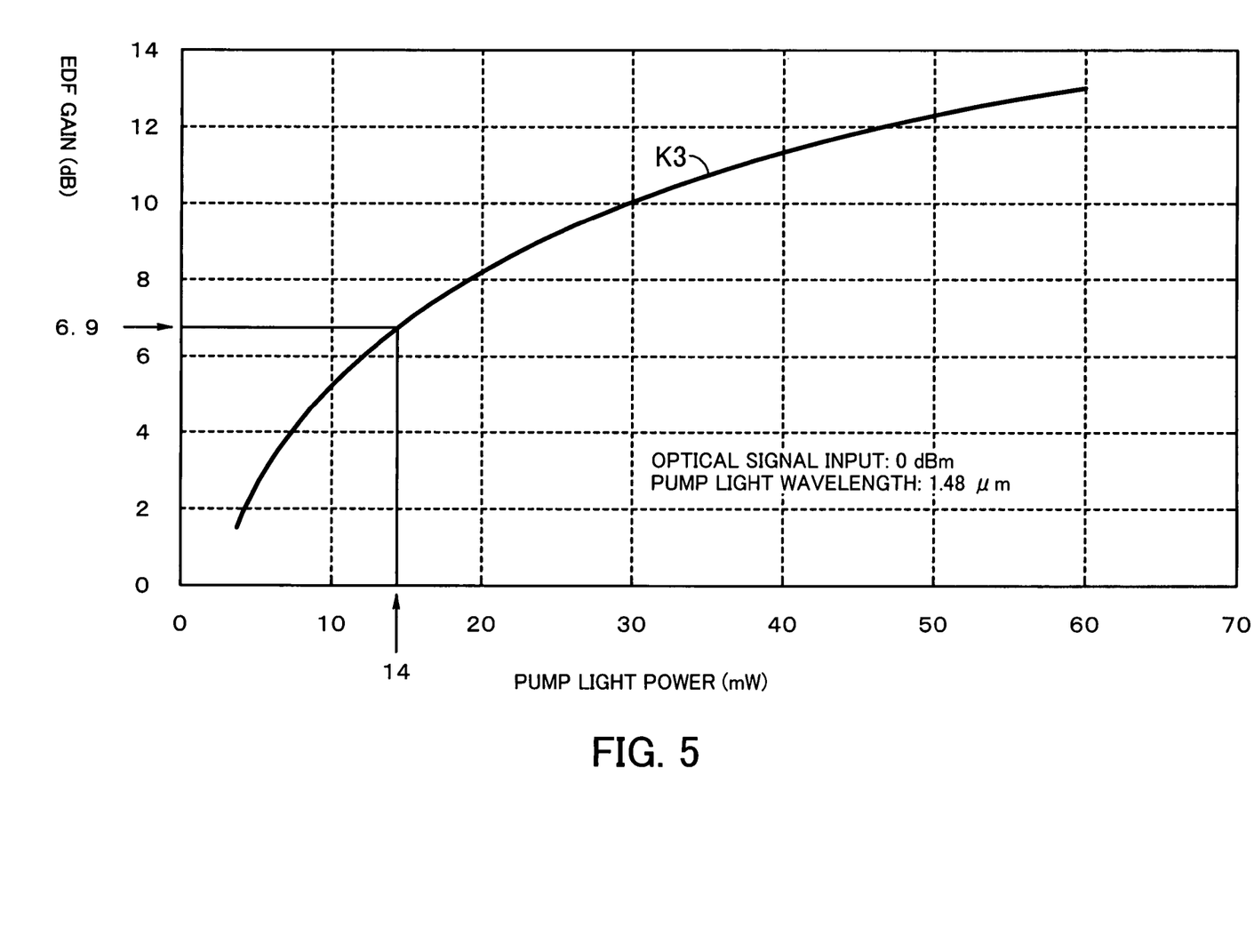
FIG. 5 is a graph illustrating the relation between pump light power and EDF gain.

The gain of the EDF 41c when input with the redirected pump light R1 will be now derived. FIG. 5 shows the relation between pump light power (mW) and EDF gain (dB), wherein the horizontal axis indicates pump light power (mW) and the vertical axis indicates EDF gain (dB). Curve K3 indicates the gain of the EDF relative to the pump light power observed in the case where the optical signal input was 0 dBm and the pump light wavelength was in the 1.48 μm band.

The gain 11.5 dB of the redirected pump light R1 will be converted into the unit W. Since $11.5 \text{ dB}=10\times\text{Log}_{10}(X \text{ mW}/1 \text{ mW})$, $11.5/10=\text{Log}_{10}(X \text{ mW}/1 \text{ mW}) \Leftrightarrow 10^{11.5/10}=X$ mW/1 mW, hence $X=1 \text{ mW}\times 14.1\ldots=14$ mW.

In FIG. 5, a value on the vertical axis corresponding to 14 mW on the horizontal axis is approximately 6.9 dB. Namely, where a 1 W pump light source is used as the pump light source 31a, the gain of the EDF 41c acquired by the redirected pump light R1 which has propagated through the line for 60 km is found to be 6.9 dB.

The input power of the repeater amplifier 24b is given by (transmit output power of the optical signal D2 from the branch station 30)−(length of the optical fiber transmission path from the branch station 30 to the repeater 24)×(fiber loss caused during optical signal transmission)+(gain of the EDF 41c). Thus, even if the gain of the EDF 41c is assumed to be 6.0 dB (even if 6.0 smaller than 6.9 is considered in anticipation of a more rigorous condition), +13 dBm−(60 km+30 km)×0.21 dB/km+6.0 dB=0.1 dBm. The derived value is equal to the repeater input power (+0.1 dBm) shown in FIG. 3 as the initial condition and fulfills the repeater amplifier input condition without the use of repeater amplification, proving that the optical signal can be transmitted through the branch line L5b without the need for a repeater.

As described above, according to the present invention, the high-output pump light source 31a is arranged at the branch station 30 to amplify the receiving optical signal by means of Raman amplification. Further, the EDF 41c is inserted in the transmit line in the optical branching device 40 through which the optical signal transmitted from the branch station 30 flows, and the pump light is redirected in the device to be introduced into the EDF 41c, so that the power of the optical signal transmitted from the branch station 30 is amplified.

With this arrangement, even if the length of the branch lines L5 is approximately equal to the ordinary span length, the power level of the optical signal input to the repeater amplifier 24b can be maintained at an adequate level without using repeaters inserted in the branch lines L5 while at the same time avoiding lowering of the power level of the optical signal input to the branch station 30 and without the need to increase the power of the optical signal transmitted from the branch station 30.

Also, the pump light is used in common to amplify the optical signal input to the branch station 30 by means of Raman amplification and to amplify the power of the optical signal transmitted from the branch station 30 by means of the EDF arranged in the optical branching device 40, and the pump light source 31a is arranged in the branch station 30. This eliminates the need to feed electricity to the branch lines L5, making it possible to construct economical systems.

In the optical transmission system of the present invention, the pump light originated from the branch station and propagated through a line is redirected to the paired line through which the optical signal transmitted from the branch station flows, to excite the amplification medium inserted in the paired line and doped with an active material for optical amplification and thereby amplify the power of the optical signal transmitted from the branch station. This permits the transmission distance to be extended without the need for repeaters, making it possible to construct economical and high-quality optical transmission systems.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system for branching optical signals to allow the optical signals to be communicated among at least three stations or more, comprising:

a branch station for performing non-repeated optical communication with an optical branching point, said branch station including a light pumping section for causing pump light to enter an optical fiber through which a branched, receiving optical signal flows, to perform optical amplification by using the optical fiber as an amplification medium; and an optical branching device including an optical amplification section for redirecting the pump light originated from said branch station and propagated through a line to a paired line through which an optical signal transmitted from said branch station flows, to excite an amplification medium inserted in the paired line and doped with an active material for optical amplification and thereby amplify power of the optical signal transmitted from said branch station, and an optical branching section for branching the optical signal transmitted from said branch station as well as optical signals transmitted from other stations.

2. An optical branching device for transmitting optical signals, comprising:

an optical amplification section for redirecting pump light originated from a station and propagated through a line to a paired line through which an optical signal transmitted from the station flows, to excite an amplification medium inserted in the paired line and doped with an active material for optical amplification and thereby amplify power of the optical signal transmitted from the station; and an optical branching section for branching the optical signal transmitted from the station.

3. An optical amplification device for amplifying optical signals, comprising:

a demultiplexer for separating pump light originated from a station and propagated through a line and for redirecting the separated pump light to a paired line through which an optical signal transmitted from the station flows;

a multiplexer inserted in the paired line, for combining the redirected pump light with the optical signal transmitted from the station; and an amplification medium inserted in the paired line and doped with an active material for optical amplification, for receiving the redirected pump light output from said multiplexer and pumping and amplifying power of the optical signal transmitted from the station.

* * * * *